US011091698B2

(12) United States Patent
Funada et al.

(10) Patent No.: US 11,091,698 B2
(45) Date of Patent: Aug. 17, 2021

(54) ANTI-CAKING AGENT FOR SOIL

(71) Applicant: Toray Industries, Inc., Tokyo (JP)

(72) Inventors: Shigeyuki Funada, Kamakura (JP);
Takahiro Arai, Kamakura (JP);
Hiroyuki Kurihara, Otsu (JP);
Katsushige Yamada, Kamakura (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/648,747

(22) PCT Filed: Sep. 25, 2018

(86) PCT No.: PCT/JP2018/035591
§ 371 (c)(1),
(2) Date: Mar. 19, 2020

(87) PCT Pub. No.: WO2019/065691
PCT Pub. Date: Apr. 4, 2019

(65) Prior Publication Data
US 2020/0283682 A1 Sep. 10, 2020

(30) Foreign Application Priority Data

Sep. 27, 2017 (JP) .............................. JP2017-185910

(51) Int. Cl.
*C09K 17/50* (2006.01)
*A01G 24/27* (2018.01)
(Continued)

(52) U.S. Cl.
CPC .............. *C09K 17/50* (2013.01); *A01G 24/27* (2018.02); *C05F 5/006* (2013.01); *C05F 11/00* (2013.01);
(Continued)

(58) Field of Classification Search
None
See application file for complete search history.

(56) References Cited

U.S. PATENT DOCUMENTS

2016/0137680 A1* 5/2016 Thies .................... B01D 11/00
530/507

FOREIGN PATENT DOCUMENTS

CN 102030909 A 4/2011
CN 104973911 A 10/2015
(Continued)

OTHER PUBLICATIONS

Agilent Technologies GPC on Tour presentation titled Conventional GPC—Polymers and Molecular Weight, Feb. 28, 2012, accessed online from https://www.agilent.com/cs/library/slidepresentation/public/1-Conventional_GPC_-_Polymers_ans_Molecular_Weight.pdf; slides attached as a PDF pp. 1-44. (Year: 2012).*

(Continued)

*Primary Examiner* — Katie L. Hammer
(74) *Attorney, Agent, or Firm* — DLA Piper LLP (US)

(57) ABSTRACT

An anti-caking agent for soil includes, as effective ingredients: a lignin having a molecular weight peak, as measured by GPC molecular weight analysis using a UV detector at a wavelength of 254 nm, within the molecular weight range of 10,000 to 40,000; and a diatomaceous earth. A method of improving the growth of a plant uses the above described anti-caking agent for soil. The anti-caking agent for soil has the effect of reducing the caking of soil and improving the poor growth of a plant.

7 Claims, 2 Drawing Sheets

(51) Int. Cl.
*C05G 3/30* (2020.01)
*C05G 3/80* (2020.01)
*C05F 5/00* (2006.01)
*C05F 11/00* (2006.01)
*C05G 3/70* (2020.01)
*C05G 3/50* (2020.01)

(52) U.S. Cl.
CPC ............. *C05G 3/30* (2020.02); *C05G 3/70* (2020.02); *C05G 3/80* (2020.02); *C05G 3/50* (2020.02); *Y02A 40/20* (2018.01)

(56) References Cited

FOREIGN PATENT DOCUMENTS

| CN | 106544035 A | 3/2017 |
|----|-------------|--------|
| CN | 107347916 A | 11/2017 |
| JP | 51-46385 A | 4/1976 |
| JP | 54-35064 A | 3/1979 |
| JP | H10-25476 A | 1/1998 |

OTHER PUBLICATIONS

Allison Tolbert et al., "Characterization and analysis of the molecular weight of lignin for biorefining studies," Biofuels, Bioproducts and Biorefining, vol. 8, Issue 6, pp. 836-856, Jun. 4, 2014 (Abstract only).

Hongzhang Chen, "Lignocellulose biorefinery feedstock engineering," Lignocellulose Biorefinery Engineering: Principles and Applications, pp. 37-86, 2015 (Abstract only).

The First Office Action dated Jan. 8, 2021, of counterpart Chinese Application No. 201880060439.X, along with an English translation.

* cited by examiner

ANTI-CAKING AGENT FOR SOIL

TECHNICAL FIELD

This disclosure relates to an anti-caking agent for soil that contains lignin as an effective ingredient.

BACKGROUND

Lignin is a complex, naturally-occurring polymer composed of phenylpropane units and having a three-dimensional network structure. Since lignin is contained in plants in an amount of about 20 to 30%, lignin is known as an aromatic polymer most abundantly present in nature, and is drawing attentions as a renewable resource. In addition to naturally-occurring lignin, it is known that lignin is also produced during the production process of pulp and, in particular, that a large amount of lignosulfonic acid can be obtained from the waste liquid generated during the production of pulp. The use of lignosulfonic acid in various applications has been investigated, and Lignocellulose Biorefinery Engineering: Principles and Applications, page 82 (Hongzhang Chen) describes that the use thereof as a soil conditioner is expected.

Soil conditioners are materials used in soil to change the physical properties of the soil to facilitate agricultural production, and have the effects of swelling and softening the soil, improving water retention properties, improving fertilizer retention capacity, improving water permeability, facilitating the formation of aggregates and/or the like. In general, peat, bark compost, humic acid materials, wood charcoal, diatomaceous earth, zeolite, vermiculite, pearlite, bentonite, VA mycorrhizal materials, polyethyleneimine-based materials, polyvinyl alcohol-based materials and the like are used as soil conditioners.

Lignosulfonic acid contains a sulfone group, which is a hydrophilic group, and thus the use of lignosulfonic acid as a soil conditioner provides the effect of forming aggregates in soil because of its high molecular weight, while binding to the soil. As a result, lignosulfonic acid exhibits a soil conditioning effect on a soil having a low organic content and a low aggregation capacity (Lignocellulose Biorefinery Engineering: Principles and Applications, page 82 (Hongzhang Chen)). On the other hand, there has been no report that lignosulfonic acid has an anti-caking effect on a soil such as clay soil, in which the growth of plant roots is interfered with due to caking of the soil.

SUMMARY

We provide an anti-caking agent for soil that contains lignin as an effective ingredient.

We found that lignin having a molecular weight peak, as measured by GPC molecular weight analysis using a UV detector at a wavelength of 254 nm, having a molecular weight of 10,000 to 40,000, and a diatomaceous earth, are highly effective as an anti-caking agent for soil.

That is, we provide (1) to (5):
(1) An anti-caking agent for soil, including, as effective ingredients: a lignin having a molecular weight peak, as measured by GPC molecular weight analysis using a UV detector at a wavelength of 254 nm, of 10,000 to 40,000; and a diatomaceous earth.
(2) The anti-caking agent for soil according to (1), wherein the lignin is an alkaline extract of bagasse.
(3) The anti-caking agent for soil according to (1) or (2), wherein the dry weight ratio of the lignin to the diatomaceous earth is 1:1 to 1:3
(4) A method of preventing caking of soil, the method including using the anti-caking agent for soil according to any one of (1) to (3).
(5) A method of improving growth of a plant, the method including using the anti-caking agent for soil according to any one of (1) to (3).

The anti-caking agent for soil has the effect of reducing the caking of soil and improving the poor growth of a plant.

DETAILED DESCRIPTION

Examples will now be described in detail.

Lignin is a polymeric phenolic compound derived from plants. The detailed structure of lignin has not yet been clarified because of its complexity and diversity. Further, the molecular weight of lignin varies depending on the type of the biomass, extraction method and analysis method used. However, in general, lignin has been reported to have a number average molecular weight of 2,400 to 9,700 (Biofuels Bioproducts & Biorefining, Volume 8, Issue 6, 836-856 (2014)).

The anti-caking agent for soil as an effective ingredient, a lignin having a molecular weight peak, as measured by GPC molecular weight analysis at a wavelength 254 nm, within the molecular weight range of 10,000 to 40,000.

Figure 1:
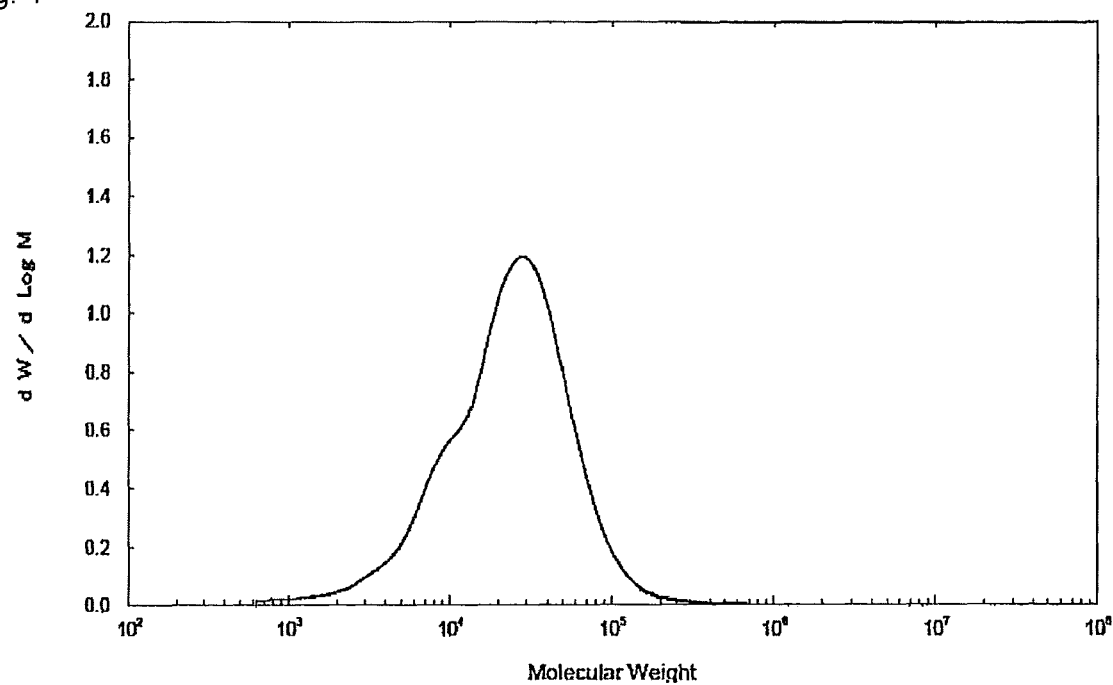
FIG. 1 is a graph showing a specific example of the result of GPC molecular weight analysis using a UV detector in an example of containing lignin.

The lignin may have a plurality of molecular weight peaks as long as the peaks are within the above described molecular weight range. Further, the lignin may also have a molecular weight peak(s) outside the above described molecular weight range. In this example, however, it is preferred that the peak with the maximum height, among the molecular weight peaks, has a molecular weight of 10,000 to 40,000. FIG. 1 shows a specific example of the result of GPC molecular weight analysis using a UV detector of the lignin to be used. A lignin having the molecular weight peak with the maximum height, as measured by the GPC analysis, at a molecular weight of less than 10,000 is often present in the form of liquid, under pH conditions (pH=5 to 8) of soil where plants can grow. A liquid lignin is not preferred, because it flows out of the soil before an anti-caking effect on soil can be sufficiently obtained.

Figure 2:
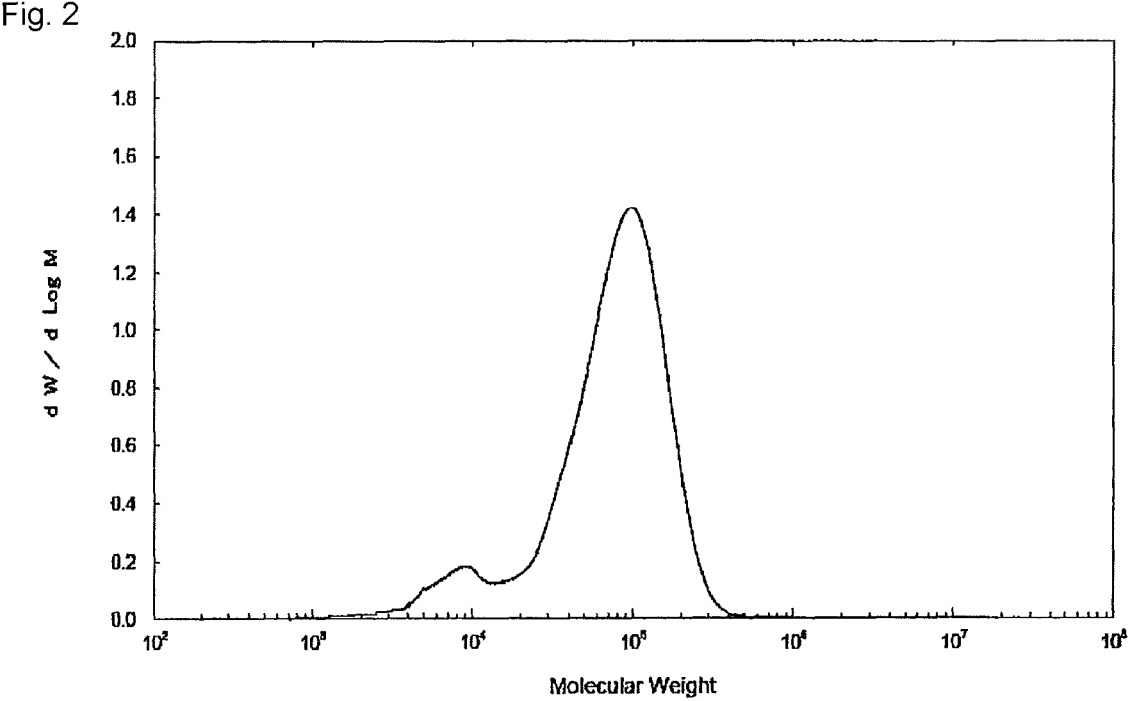
FIG. 2 is a graph showing a specific example of the result of GPC molecular weight analysis using a UV detector in an example of lignosulfonic acid.

FIG. 2 shows a specific example of the result of GPC molecular weight analysis using a UV detector, in an example containing lignosulfonic acid, which is a commonly used industrial lignin. Lignosulfonic acid, which is a commonly used industrial lignin, is a substance produced from lignin contained in wood, as a by-product during the production process of pulp by the sulfurous acid method, and which is contained in a large amount in black liquor, which is a waste liquid. The CAS Registry Number of lignosulfonic acid is 8062-15-5. By treating with sulfurous acid, sulfone groups are introduced into lignin to produce lignosulfonic acid. It can be seen from FIG. 2 that, in lignosulfonic acid, the molecular weight peak with the maximum height, as measured at a wavelength of 254 nm, is located at a value higher than 40,000. Thus, the lignin is characterized by having a molecular weight that is smaller than commonly used lignosulfonic acid.

A lignin having a higher molecular weight tends to have a higher hydrophobicity. A lignin having a high hydrophobicity has a high cohesive force between molecules, and thus has the effect of forming aggregation in soil. However, such a lignin does not have a valid effect in improving a soil containing clay at a high ratio and which is susceptible to caking. Since the lignin has a molecular weight peak within the molecular weight range of 10,000 to 40,000, it is assumed that the molecules of the lignin are dispersed in soil when mixed with the soil, and provides the effect of preventing adhesion between soil particles when mixing the soil. Prevention of the adhesion between the soil particles leads to prevention of caking of the soil, and to an increase in air permeability and water permeability of the roots of a plant, thereby providing the effect of recovering the extension of the roots and improving the growth of the plant.

The lignin preferably has a molecular weight peak within the molecular weight range of 10,200 to 37,000, and more preferably 11,000 to 35,000.

The molecular weight of the lignin can also be evaluated by the number average molecular weight. The lignin preferably has an average molecular weight of 4,000 to 40,000, and more preferably 8,000 to 20,000, as a number average molecular weight as measured by GPC molecular weight analysis using a UV detector.

"GPC," as in GPC molecular weight analysis, is an abbreviation of "Gel Permeation Chromatography," and capable of separating compounds in a sample to be measured, by molecular size. Further, it is also possible to calculate the molecular weight of the compounds, by detecting the relative amounts of the separated polymers, by a detector. In GPC molecular weight analysis, the relationship between elution time and molecular weight is determined in advance, using a standard polymer, and the molecular weight of the sample to be measured is obtained by conversion, based on the relationship. The molecular weight of the lignin is a value measured using polyethylene glycol and polyethylene oxide as standard polymers. Further, the number average molecular weight is calculated from the measured value of the molecular weight, in accordance with Equation (1). In Equation (1), Mn represents the number average molecular weight, M represents the molecular weight, N represents the number of polymers, and C represents the sample concentration:

$$Mn = \Sigma(Mi \cdot Ni)/\Sigma(Ni) = \Sigma Ci/\Sigma(Ci/Mi) \qquad (1).$$

As the detector to be used in the GPC analysis, a detector capable of detecting a wavelength of 250 to 300 nm, which is the absorption wavelength of lignin, is used. The GPC analysis can be carried out at any wavelength in which an aromatic compound has an absorption, and examples of representative wavelengths to be used in the GPC analysis include 254 nm, 280 nm and 300 nm. A value analyzed at 254 nm is used. As the detector to be used in the GPC analysis, a multiple wavelength ultraviolet-visible absorption detector (SPD-M20A), manufactured by Shimadzu Corporation, is used.

The columns to be used in the GPC molecular weight analysis are not particularly limited, and the molecular weight is a value measured using TSK gel GMPWXL and G2500PWXL.

The lignin preferably contains no sulfone group. When the lignin contains sulfone groups, sulfur molecules may be excessively supplied to the soil, possibly interfering with the growth of plants. Further, it is also because the sulfur molecule in a sulfone group is prone to cause bad smell.

The plant to be used as a raw material for the lignin is preferably a plant belonging to the family Gramineae, more preferably rice straw, wheat straw, bagasse, which is strained lees of sugar cane, sugar cane tips, or sugar cane leaves, and most preferably bagasse.

The lignin can be extracted from the above described plant by a method such as, for example, extraction using an organic solvent (such as ethanol or ethyl acetate), acid extraction, alkaline extraction or the like, and an alkaline extraction method is preferred. Further, among alkaline extraction methods, an alkaline hot water extraction is preferred.

Examples of alkaline compounds to be used in the alkaline extraction method include sodium hydroxide, potassium hydroxide, calcium hydroxide, magnesium hydroxide and ammonia, but not particularly limited thereto. Among these, sodium hydroxide and potassium hydroxide are preferred, and sodium hydroxide is more preferred.

The alkaline hot water extraction method is preferably carried out under the conditions of a pH of 10 or more and 13.5 or less, a temperature of 80° C. or higher and 120° C. or lower, and a reaction time of 0.5 hours or more, and more preferably under the conditions of a pH of 10.5 or more and 13.0 or less, a temperature of 90° C. or higher and 120° C. or lower, and a reaction time of one hour or more. The upper limit of alkaline concentration is not particularly limited as long as the lignin can be obtained. However, when the alkaline concentration is too high relative to the concentration of the biomass used, the molecular weight of the lignin is decreased. This leads to problems such as, for example, a failure to obtain a component effective as the anti-caking agent for soil, and generation of a large amount of remaining salts, making it troublesome to separate the salts from the lignin. Accordingly, in the case of sodium hydroxide, for example, it is preferred that 180 g or less of sodium hydroxide be used for the treatment, with respect to 1 kg of bagasse in dry weight.

Specifically, the alkaline hot water extraction method can be carried out, for example, by allowing a solution of bagasse having a concentration of 50 g/L (dry weight) to react with a 0.45 (wt/wt) % aqueous solution of sodium hydroxide at 90° C. for 2 hours. In this manner, it is possible to extract the lignin. The term "dry weight" refers to the weight of a biomass after drying the biomass at 105° C. until a constant weight is achieved.

By extracting the lignin from a plant by an alkaline hot water extraction method or the like, neutralizing the resultant to a pH of 5 or less, and then subjecting the resultant to solid-liquid separation, the lignin can be collected on the solid content side. A polymer lignin insolubilized at a pH of 5 can be made soluble in water again, by adjusting the pH to the alkaline side from pH 5, for example, to a pH of 10 or more. In the anti-caking agent for soil, the lignin used in a solid state.

Diatomaceous earth is a deposit formed from fossils of shells of diatoms, which are a kind of algae. The shells of diatoms are composed of silicon dioxide, and thus the main component of the diatomaceous earth is also silicon dioxide. The type of the diatomaceous earth is preferably calcined diatomaceous earth.

Silicate clay, which is an example of a soil conditioner containing silicon, is a substance different from the diatomaceous earth used herein. Silicate clay is also referred to as soft silica and contains, as a main component, a silicate mineral referred to as montmorillonite (chemical formula: $(Na,Ca)_{0.33}(Al,Mg)_2Si_4O_{10}(OH)_2 \cdot nH_2O)$.

The anti-caking agent for soil provides a smaller anti-caking effect on soil, when the anti-caking agent for soil is mixed in a small amount. When mixed in too large an amount, on the other hand, it compromises the total environmental balance, including fertilizer retention capacity and the effects on plants provided by microorganisms retained in the soil, which are inherent in the soil, resulting in a relative decrease in the improvement in the growth capacity of plants.

The mixing ratio of the amount of the lignin relative to the amount of soil is not particularly limited, as long as the anti-caking effect on soil can be obtained. However, it is preferred that 2 to 20 parts by weight, and more preferably 3 to 10 parts by weight of the lignin in dry weight be mixed with respect to 100 parts by weight of soil. The lignin can be suitably used as long as it is in a solid state, either in a dried state or in a state containing moisture. Further, in preventing the caking of soil in a cultivated land, it is preferred that 8 to 80 tons of the lignin in dry weight be mixed per 10 a of the cultivated land.

The mixing ratio of the amount of the diatomaceous earth relative to the amount of soil is not particularly limited as long as the anti-caking effect on soil can be obtained. However, it is preferred that 3 to 20 parts by weight, and more preferably 5 to 20 parts by weight of the diatomaceous earth be mixed with respect to 100 parts by weight of soil. Further, in preventing caking of soil in a cultivated land, it is preferred that 12 to 80 tons of the diatomaceous earth in dry weight be mixed per 10 a of the cultivated land.

In the anti-caking agent, a preferred mixing ratio of the lignin and the diatomaceous earth is not particularly limited, as long as the anti-caking effect on soil can be obtained. However, it is preferred that the lignin and the diatomaceous earth be mixed at a dry weight ratio of from 1:1 to 1:3.

The mixing ratio of the anti-caking agent with respect to the amount of soil is not particularly limited, as long as the anti-caking effect on soil can be obtained. However, it is preferred that 5 to 25 parts by weight of the total amount of the lignin and the diatomaceous earth, in dry weight, be mixed with respect to 100 parts by weight of soil. Further, in preventing the caking of soil in a cultivated land, it is preferred that 20 to 92 tons of the anti-caking agent be distributed and mixed per 10a of the cultivated land.

The dry weights of the lignin, the diatomaceous earth, and soil are each calculated as the weight of an object after drying the object at 105° C. until a constant weight is achieved, in the same manner as calculating the dry weight of a biomass as described above. In calculating the dry weight ratio of soil, the weight of the cultivated soil at a depth of 30 cm from the ground surface is calculated. When a plant is grown using a planter or the like, the weight of the soil within the planter is calculated.

The anti-caking agent for soil may contain another anti-caking agent for soil, in addition to the lignin and the diatomaceous earth, and it is possible to improve the anti-caking effect on soil by using another soil conditioner in combination. Examples of the other soil conditioner include peat, bark compost, humic acid materials, wood charcoal, zeolite, vermiculite, pearlite, bentonite, VA mycorrhizal materials, polyethyleneimine-based materials, and polyvinyl alcohol-based materials.

The mixing ratio of the anti-caking agent for soil and the other soil conditioner is not particularly limited, as long as the anti-caking effect can be obtained. However, it is preferred that the anti-caking agent for soil and the other soil conditioner be mixed at a dry weight ratio of 1:1 to 1:3.

The anti-caking agent for soil may be mixed with soil either by a mixing method using an agricultural machine, or a manual mixing method. The mixing method is not particularly limited, as long as the anti-caking agent can be mixed homogeneously to the extent that a reduction in the caking of soil can be observed.

The lignin and the diatomaceous earth may be mixed in advance, before being mixed with soil, or may be mixed separately with the soil. Further, in using the other anti-caking agent for soil other than the lignin and the diatomaceous earth, described above, the respective anti-caking agents for soil may be mixed separately with soil, or the anti-caking agents may be mixed with each other in advance, before being mixed with the soil. When the anti-caking agents are separately mixed with soil, the anti-caking agents may be mixed in any order.

Examples of the soil on which the anti-caking effect is exerted include: a soil in which dirt is easily solidified and caked, thereby physically interferes with the extension of roots; and a soil in which air is prevented from infiltrating deep into the soil due to caking, and thus causes lack of oxygen. Specific examples include a soil containing 20% by weight or more of clay, in the grain size composition of the soil. Examples of the soil in which the anti-caking effect on our soil can be expected, in particular, include a soil containing from 20 to 40% by weight of clay. The soil contains sand and silt in addition to clay. The term "clay" is used as a generic term referring to clastic materials having a particle size of 2 µm or less, and the term "sand" is used as a generic term referring to clastic materials having a particle size of from 2 to 0.02 mm, and the term "silt" is used as a generic term referring to clastic materials having a particle size of from 0.02 to 0.002 mm.

As the anti-caking effect on soil, caking of soil is prevented to improve the extension of plant roots, in a soil in which the extension of the plant roots is interfered with due to the caking of the soil. When the extension of the roots of a plant is improved, the plant is allowed to absorb a larger amount of nutrition from the roots, as a result of which the growth of the above-ground portion of the plant is improved. Specifically, an improvement in the growth of a plant can be evaluated, when the fresh weight of the above-ground portion or the dry weight of the underground portion of the plant is increased by the use of the anti-caking agent for our soil compared to when the anti-caking agent is not used. It is preferred that both the fresh weight of the above-ground portion and the dry weight of the underground portion be increased. The term "above-ground portion" refers to a portion of a plant appearing above the ground. The term "underground portion" refers to a portion of a plant present underground. The above-ground portion and the underground portion are divided by the ground surface. Further, the term "fresh weight" refers to the weight of a plant, as it is, including the moisture within the plant at the time of harvest.

The type of the plant in which an improvement in growth can be expected using the anti-caking agent for our soil is not particularly limited. However, such a plant is preferably a plant belonging to the family Gramineae, a root vegetable, or a plant belonging to the family Apiaceae. The plant belonging to the family Gramineae is preferably rice, wheat, barley, corn, sugar cane, or a plant of the genus *Sorghum* or *Erianthus*, and more preferably sugar cane. The root vegetable is preferably tubers, radishes, burdock, carrot or turnip, and more preferably tubers or radishes. The tubers are preferably potato, sweet potato or tapioca, and more preferably tapioca. The radishes are preferably radish. The plant belonging to the family Apiaceae is preferably *Angelica keiskei*, celery, *Cryptotaenia japonica*, carrot, coriander, *Oenanthe javanica* or parsley, and more preferably coriander.

EXAMPLES

Our anti-caking agents will now be specifically described, with reference to Examples. In each of the Comparative Examples 1 to 10 and Examples 1 to 5, the test was carried out 5 times simultaneously under each of the corresponding conditions. Each of the values shown in Tables 1, 2 and 3 are the mean value of the 5 test results.

Reference Example 1: GPC Molecular Weight Distribution Measurement

GPC molecular weight analysis was carried under the following conditions.
Detector: a multiple wavelength ultraviolet-visible absorption detector UV (SPD-M20A, wavelength: 254 nm, manufactured by Shimadzu Corporation)
Columns: TSK gel GMPWXL and G2500PWXL, one each, connected in series (diameter: 7.8 mm×30 cm, manufactured by Tosoh Corporation)
Solvent: an ammonia buffer solution (pH 11)/methanol (1/1=v/v)
Flow velocity: 0.7 mL/min
Column temperature: 23° C.
Injection volume: 0.2 mL
Standard sample: monodisperse polyethylene oxide and polyethylene glycol; manufactured by Tosoh Corporation, Polymer Laboratories
The number average molecular weight was calculated in accordance with Equation (1).
The relationship between the elution time and the logarithm of the molecular weight was obtained using the standard sample, and converted to the weight fraction dW/d log M (W represents the weight) per Log M (M represents the molecular weight). The logarithm of the molecular weight was taken along the abscissa and the ordinate was plotted such that the peak area was 1, followed by analysis using the plot.

Reference Example 2: Method of Measuring Fresh Weight of Above-ground Portion Each plant was cut near the ground level and the above-ground portion thereof was harvested. Then the weight of the above-ground portion was measured.

Reference Example 3: Method of Measuring Dry Weight of Underground Portion

Each plant was cut near the ground level, and dirt was removed under running water, taking utmost care not to cut off roots from the underground portion and the dirt remained in the pot. After drying at 105° C., the dry weight of the underground portion was measured.

Reference Example 4: Sulfur Analysis

The sulfur analysis was carried out in the following method to measure the amount of sulfone groups contained in lignin. Each sample was weighed, and burned within a combustion tube in an analyzer, using the apparatus and conditions shown below. After allowing a solution to absorb the generated gas, a part of the resulting absorption liquid was analyzed by ion chromatography (analyzed twice, repeatedly).
Combustion and Absorption Conditions
System: AQF-100, GA-100 (manufactured by Mitsubishi Chemical Corporation)
Electric furnace temperature: inlet: 1,000° C.; outlet: 1,100° C.
Gas: Air/$O_2$: 200 mL/min.
$O_2$: 400 mL/min.
Absorption liquid: $H_2O_2$ 0.1%, internal standard: Br 2 µg/mL
Amount of absorption liquid: 10 mL
Ion Chromatography: Anion Analysis Conditions
System: ICS 1500 (manufactured by DIONEX)
Mobile phase: 2.7 mmol/L $Na_2CO_3$/0.3 mmol/L $NaHCO_3$
Flow velocity: 1.50 mL/min.
Detector: an electrical conductivity detector
Injection volume: 100 µL

Comparative Example 1: Sugar Cane Pot Test (Without Addition of Anti-caking Agent For Soil)

One kg of a mixture of red earth (which is derived from loamy layer of the Kanto Region, and which contains 25% by weight of clay) and river sand mixed at a weight ratio of 8:2 was introduced into a No. 6 pot, and sugar cane seedlings (produced in Okinawa, with a stem height of from 7 to 8 cm) were planted. A chemical fertilizer (nitrogen-phosphorus-potassium=8-8-8) as a basal fertilizer was applied in an amount of 5 kg/10 a in terms of nitrogen. One month later, 2 kg/10 a of the fertilizer was further applied, as an additional fertilizer. When the dirt on the surface layer was dry, the pot was watered as appropriate, until water leaked from the bottom of the pot. Eighty days later, the fresh weight of the above-ground portions and the dry weight of the underground portions of the plants were measured, and the results are shown in Table 1.

Comparative Example 2: Sugar Cane Pot Test (Lignosulfonic Acid)

The same operation as in Comparative Example 1 was performed, except that 10 parts by weight of lignosulfonic acid (obtained by neutralizing VANILLEX HW, manufactured by Nippon Paper Industries co., Ltd., with 10 N sodium hydroxide to pH 7; the sulfur content analyzed in Reference Example 4 was 2.8%), as the anti-caking agent for soil, was mixed with respect to 100 parts by weight of the dirt used in Comparative Example 1, obtained by mixing red earth (which is derived from loamy layer of the Kanto Region, and which contains 25% of clay) and river sand at a weight ratio of 8:2. Eighty days later, the fresh weight of the above-ground portions and the dry weight of the underground portions of the plants were measured, and the results are shown in Table 1.

Comparative Example 3: Sugar Cane Pot Test (Calcined Diatomaceous Earth)

The same operation as in Comparative Example 1 was performed, except that 10 parts by weight of calcined diatomaceous earth, as the anti-caking agent for soil, was mixed with respect to 100 parts by weight of the dirt used in Comparative Example 1, obtained by mixing red earth (which is derived from loamy layer of the Kanto Region, and which contains 25% of clay) and river sand at a weight ratio of 8:2. Eighty days later, the fresh weight of the above-ground portions and the dry weight of the underground portions of the plants were measured, and the results are shown in Table 1.

Comparative Example 4: Sugar Cane Pot Test (Our Lignin)

One kg of bagasse (purchased from Taito Nosan K.K., produced in Vietnam) was added to and mixed with a 0.45% by weight aqueous solution of sodium hydroxide to achieve 5% by weight in dry weight, and the resulting mixture was allowed to react at 90° C. for two hours, thereby extracting lignin in an alkaline hot water liquid. The thus obtained alkaline hot water liquid was adjusted to pH 5 using 6 N hydrochloric acid, to produce the lignin as a precipitate. A liquid containing our lignin was subjected to solid-liquid separation using a filter press (YTO-type; manufactured by Yabuta Kikai Co., Ltd.), to collect the solid content of the lignin. The collected lignin was dried at 40° C. to reduce the moisture content to 20% in weight ratio. The same operation as in Comparative Example 1 was performed, except that 10 parts by weight (8 parts by weight in dry weight) of our lignin as the anti-caking agent for soil was mixed with respect to 100 parts by weight of the dirt used in Comparative Example 1, obtained by mixing red earth and river sand at a weight ratio of 8:2. Eighty days later, the fresh weight of the above-ground portions and the dry weight of the underground portions of the plants were measured, and the results are shown in Table 1.

Further, the solid content of our lignin was dissolved in a solution whose pH was adjusted to 12 or more with NaOH, and the molecular weight distribution was measured under the conditions used in Reference Example 1. As a result, as shown in FIG. 1, the lignin showed a molecular weight peak at a molecular weight of 21,000, and had a number average molecular weight of 13,800. When analyzed under the conditions used in Reference Example 4, the sulfur content could not be detected.

Comparative Example 5: Lignin Having Molecular Weight Peak, as Measured by GPC Molecular Weight Analysis at Wavelength of 254 nm, at Molecular Weight of Less than 10,000

Figure 3:
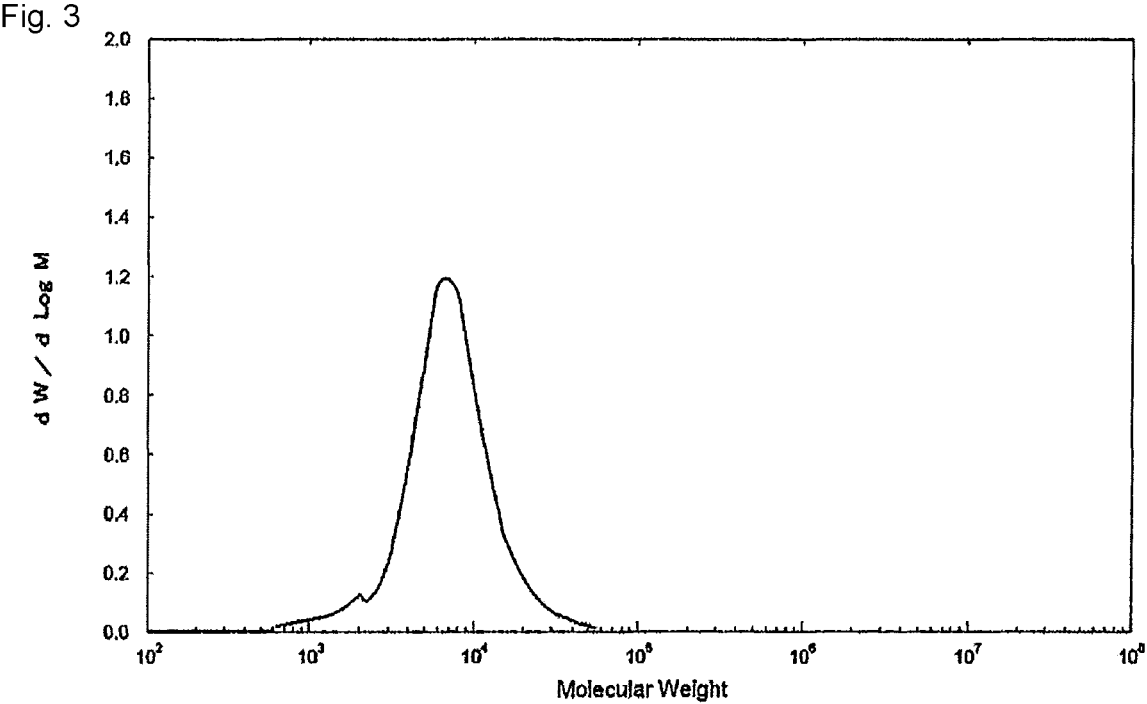
FIG. 3 is a graph showing a specific example of the result of GPC molecular weight analysis in an example of containing a liquid obtained by solid-liquid separation of an alkaline hot water extract of bagasse, using a filter press.

The liquid fraction obtained by subjecting the alkaline hot water extract of bagasse prepared in Comparative Example 4 to solid-liquid separation using a filter press, was analyzed by GPC molecular weight analysis under the conditions used in Reference Example 1. As a result, as shown in FIG. 3, the liquid fraction showed a peak at a molecular weight of 7,000, and had a number average molecular weight was 4,000. As described above, a lignin having a peak at a molecular weight of less than 10,000 is in the form of liquid within the pH region where plants can grow, and thus determined to be unusable as an anti-caking agent for soil.

Example 1: Sugar Cane Pot Test (Combined Use of Our Lignin and Calcined Diatomaceous Earth)

Our lignin produced in Comparative Example 4 and calcined diatomaceous earth were mixed at a dry weight ratio of 1:2, to prepare an anti-caking agent for soil in which our lignin and calcined diatomaceous earth were mixed (moisture content: 10%). The same operation as in Comparative Example 1 was performed, except that 10 parts by weight of the thus mixed anti-caking agent for soil was mixed with respect to 100 parts by weight of the dirt used in Comparative Example 1 (when the weight ratio is converted in terms of dry weight, 3 parts by weight of our lignin and 6 parts by weight of the diatomaceous earth, with respect to 100 parts by weight of the dirt), which dirt was obtained by mixing red earth and river sand at a weight ratio of 8:2. Eighty days later, the fresh weight of the above-ground portions and the dry weight of the underground portions of the plants were measured, and the results are shown in Table 1.

It can be seen from the results shown in Table 1 that, in Example 1 in which our lignin and the diatomaceous earth were used as the anti-caking agent for soil, for growing sugar cane plants, both the fresh weight of the above-ground portions and the dry weight of the underground portions increased as compared to Comparative Examples 1 to 4. Since the dry weight of the underground portions showed a particular increase, it is thought that improving the extension of roots resulted in an improvement in the growth of the above-ground portions, as well. That is, our lignin has a molecular weight peak, as measured by GPC molecular weight analysis using a UV detector at a wavelength of 254 nm, within the molecular weight range of 10,000 to 40,000, and it is believed that the use of this lignin and the diatomaceous earth as the anti-caking agent for soil, and the mixing of the agent with soil, prevented the caking of the soil and improved the growth of the roots, thereby improving the growth of the above-ground portions of the sugar cane plants. In contrast, an increase in both the fresh weight of the above-ground portions and the dry weight of the underground portions was hardly observed in Comparative Examples 2 and 3 compared to Comparative Example 1. Accordingly, hardly any anti-caking effect on soil was observed in a lignosulfonic acid having a molecular weight peak at a value higher than 40,000. Further, in Comparative Example 3 in which the diatomaceous earth was used as the anti-caking agent for soil, and in Comparative Example 4 in which our lignin was used as the anti-caking agent for soil, both the fresh weight of the above-ground portions and the dry weight of the underground portions increased compared to Comparative Example 1. However, the effect of the anti-caking agent was smaller compared to that in Example 1. These results have revealed that, the use of our lignin and the diatomaceous earth as the anti-caking agent for soil provides the effect of increasing the degree of increase in the fresh weight of the above-ground portions and the dry weight of the underground portions compared to when the lignin and the diatomaceous earth are used singly.

TABLE 1

| | Comparative Example 1 | Comparative Example 2 | Comparative Example 3 | Comparative Example 4 | Example 1 |
|---|---|---|---|---|---|
| Results of Sugar Cane Pot Test (n = 5) | | | | | |
| Anti-caking agent | None | Lignosulfonic acid | Calcined diatomaceous earth | Lignin to be used in this invention | Lignin to be used in this invention + calcined diatomaceous earth |
| Average fresh weight of above-ground portions (g) | 34.2 | 34.0 | 35.2 | 37.4 | 40.1 |
| Average dry weight of underground portions (g) | 20.0 | 22.1 | 21.5 | 31.7 | 36.2 |

Comparative Example 6: Coriander Pot Test (without Addition of Anti-Caking Agent for Soil)

The same operation as in Comparative Example 1 was performed, except that coriander seedlings were used instead of the sugar cane seedlings used in Comparative Example 1. Eighty days later, the fresh weight of the above-ground portions of the plants were measured, and the results are shown in Table 2.

Comparative Example 7: Coriander Pot Test (Lignosulfonic Acid)

The same operation as in Comparative Example 2 was performed, except that coriander seedlings were used instead of the sugar cane seedlings used in Comparative Example 2. Eighty days later, the fresh weight of the above-ground portions of the plants were measured, and the results are shown in Table 2.

Comparative Example 8: Coriander Pot Test (Calcined Diatomaceous Earth)

The same operation as in Comparative Example 3 was performed, except that coriander seedlings were used instead of the sugar cane seedlings used in Comparative Example 3. Eighty days later, the fresh weight of the above-ground portions of the plants were measured, and the results are shown in Table 2.

Comparative Example 9: Coriander Pot Test (Our Lignin)

The same operation as in Comparative Example 4 was performed, except that coriander seedlings were used instead of the sugar cane seedlings used in Comparative Example 4. Eighty days later, the fresh weight of the above-ground portions of the plants were measured, and the results are shown in Table 2.

Example 2: Coriander Pot Test (Combined Use of Our Lignin and Calcined Diatomaceous Earth)

The same operation as in Example 1 was performed, except that coriander seedlings were used instead of the sugar cane seedlings used in Example 1. Eighty days later, the fresh weight of the above-ground portions of the plants were measured, and the results are shown in Table 2.

It can be seen from the results shown in Table 2 that, in Example 2 in which our lignin and the diatomaceous earth were used as the anti-caking agent for soil, for growing coriander plants, an increase in the fresh weight of the above-ground portions was observed compared to Comparative Examples 6 to 9. In contrast, an increase in the fresh weight of the above-ground portions was hardly observed in Comparative Examples 7 and 8 compared to Comparative Example 5.

TABLE 2

| | Comparative Example 6 | Comparative Example 7 | Comparative Example 8 | Comparative Example 9 | Example 2 |
|---|---|---|---|---|---|
| Results of Coriander Pot Test (n = 5) | | | | | |
| Anti-caking agent | None | Lignosulfonic acid | Calcined diatomaceous earth | Lignin to be used in this invention | Lignin to be used in this invention + calcined diatomaceous earth |
| Average fresh weight of above-ground portions (g) | 8.4 | 8.6 | 8.6 | 9.8 | 12.3 |

Comparative Example 10: Radish Pot Test (without Addition of Anti-Caking Agent for Soil)

One kg of a mixture of red earth (derived from loamy layer of the Kanto Region, and containing 25% by weight of clay) and river sand mixed at a weight ratio of 8:2 was introduced into a No. 6 pot, and seeds of radish (Sakata Seeds, Speedy Vegetable) were planted. After germination, seedlings were thinned to 3 plants per pot. A chemical fertilizer (nitrogen-phosphorus-potassium=8-8-8) as a basal fertilizer was applied in an amount of 5 kg/10 a in terms of nitrogen. When the dirt on the surface layer was dry, the pot was watered as appropriate, until water leaked from the bottom of the pot. Sixteen days after seeding, the fresh weight of the above-ground portions was measured, and the results are shown in Table 3.

Example 3: Radish Pot Test (Combined Use of Our Lignin and Calcined Diatomaceous Earth)

Our lignin produced in Comparative Example 4 and calcined diatomaceous earth were mixed at a dry weight ratio of 1:1, to prepare an anti-caking agent for soil in which our lignin and calcined diatomaceous earth were mixed (moisture content: 10%). The same operation as in Comparative Example 10 was performed, except that 10 parts by weight of the thus mixed anti-caking agent for soil was mixed with respect to 100 parts by weight of the dirt used in Comparative Example 1 (when the weight ratio is converted in terms of dry weight, 4.5 parts by weight of the our lignin and 4.5 parts by weight of the diatomaceous earth, with respect to 100 parts by weight of the dirt), which dirt was obtained by mixing red earth and river sand at a weight ratio of 8:2. Sixteen days after seeding, the fresh weight of the above-ground portions was measured, and the results are shown in Table 3.

Example 4: Radish Pot Test (Combined Use of Our Lignin and Calcined Diatomaceous Earth)

Our lignin produced in Comparative Example 4 and calcined diatomaceous earth were mixed at a dry weight ratio of 1:2, to prepare an anti-caking agent for soil in which our lignin and calcined diatomaceous earth were mixed (moisture content: 10%). The same operation as in Comparative Example 10 was performed, except that 10 parts by weight of the thus mixed anti-caking agent for soil was mixed with respect to 100 parts by weight of the dirt used in Comparative Example 1 (when the weight ratio is converted in terms of dry weight, 3 parts by weight of our lignin and 6 parts by weight of the diatomaceous earth, with respect to 100 parts by weight of the dirt), which dirt was obtained by mixing red earth and river sand at a weight ratio of 8:2. Sixteen days after seeding, the fresh weight of the above-ground portions was measured, and the results are shown in Table 3.

Example 5: Radish Pot Test (Combined Use of Our Lignin and Calcined Diatomaceous Earth)

Our lignin produced in Comparative Example 4 and calcined diatomaceous earth were mixed at a dry weight ratio of 1:2, to prepare an anti-caking agent for soil in which our lignin and calcined diatomaceous earth were mixed (moisture content: 10%). The same operation as in Comparative Example 10 was performed, except that 10 parts by weight of the thus mixed anti-caking agent for soil was mixed with respect to 100 parts by weight of the dirt used in Comparative Example 1 (when the weight ratio is converted in terms of dry weight, 2.25 parts by weight of our lignin and 6.75 parts by weight of the diatomaceous earth, with respect to 100 parts by weight of the dirt), which dirt was obtained by mixing red earth and river sand at a weight ratio of 8:2. Sixteen days after seeding, the fresh weight of the above-ground portions was measured, and the results are shown in Table 3.

The results of Comparative Example 10 and Examples 3 to 5 confirmed that, when our lignin and the diatomaceous earth were mixed at a dry weight ratio of from 1:1 to 1:3, and used as the anti-caking agent for soil, the effect of increasing the fresh weight of the above-ground portions of radish plants can be obtained compared to when the anti-caking agent for soil was not added.

TABLE 3

Results of Radish Pot Test (n = 5)

| | Comparative Example 10 | Example 3 | Example 4 | Example 5 |
|---|---|---|---|---|
| Lignin to be used in this invention:diatomaceous earth (dry-weight ratio) | None | 1:1 | 1:2 | 1:3 |
| Average fresh weight of above-ground portions (g) | 2.5 | 3.2 | 3.5 | 3.1 |

The invention claimed is:

1. An anti-caking agent for soil comprising, as effective ingredients: a lignin having a molecular weight peak within the molecular weight range of 10,000 to 40,000, as measured by GPC molecular weight analysis using a UV detector at a wavelength of 254 nm; and a diatomaceous earth.

2. The anti-caking agent for soil according to claim 1, wherein said lignin is an alkaline extract of bagasse.

3. The anti-caking agent for soil according to claim 1, wherein a dry weight ratio of said lignin to said diatomaceous earth is 1:1 to 1:3.

4. A method of preventing caking of soil, the method comprising mixing the anti-caking agent for soil according to claim 1 and soil.

5. A method of improving growth of a plant, the method comprising mixing the anti-caking agent for soil according to claim 1 and soil; and growing the plant using the soil.

6. The anti-caking agent for soil according to claim 2, wherein a dry weight ratio of said lignin to said diatomaceous earth is 1:1 to 1:3.

7. An anti-caking agent for soil comprising, as effective ingredients: a lignin having a molecular weight peak within the molecular weight range of 10,000 to 40,000, as measured by GPC molecular weight analysis using a UV detector at a wavelength of 254 nm; and a diatomaceous earth, wherein a dry weight ratio of a total amount of the lignin and the diatomaceous earth to a total amount of other conditioner(s) comprising the anti-caking agent is not more than 3.

* * * * *